US008891670B2

(12) United States Patent
Ishaug

(10) Patent No.: US 8,891,670 B2
(45) Date of Patent: Nov. 18, 2014

(54) CATV TRANSMISSION SYSTEM USING ANALOG SMALL FORM FACTOR PLUGGABLE MODULES

(71) Applicant: Aurora Networks, Santa Clara, CA (US)

(72) Inventor: Brian Ishaug, Pleasanton, CA (US)

(73) Assignee: Aurora Networks, Inc., San Jose, CA (US)

( * ) Notice: Subject to any disclaimer, the term of this patent is extended or adjusted under 35 U.S.C. 154(b) by 0 days.

(21) Appl. No.: 13/672,717

(22) Filed: Nov. 9, 2012

(65) Prior Publication Data

US 2013/0308724 A1    Nov. 21, 2013

Related U.S. Application Data

(60) Provisional application No. 61/628,933, filed on Nov. 9, 2011, provisional application No. 61/628,923, filed (Continued)

(51) Int. Cl.
*H04K 1/02* (2006.01)
*H04L 25/03* (2006.01)

(Continued)

(52) U.S. Cl.
CPC ...... *H04L 25/03343* (2013.01); *H04B 10/2507* (2013.01); *H04B 10/54* (2013.01);

(Continued)

(58) Field of Classification Search
CPC ............... H04B 10/2575; H04B 10/54; H04B 10/2507; H04B 10/58; H04B 10/25751; H04B 10/25759; H04L 25/03343; G06F 2213/0016; G06F 13/4004; G06F 13/4282; G06F 13/4291

USPC ......... 375/295, 296, 297, 299, 300, 302, 306, 375/316, 318, 322, 330, 340, 342, 345
See application file for complete search history.

(56) References Cited

U.S. PATENT DOCUMENTS 6,822,874 B1   11/2004  Marler
6,881,095 B2 *  4/2005  Murr et al. ................. 439/607.2

(Continued)

FOREIGN PATENT DOCUMENTS

EP    0435125 A2    7/1991
EP    0964237 A1   12/1999
EP    2071865 A1    6/2009

OTHER PUBLICATIONS

International Search Report and Written Opinion from PCT/US2012/064451, mailed Feb. 21, 2013.

(Continued)

*Primary Examiner* — Hirdepal Singh
(74) *Attorney, Agent, or Firm* — John Bruckner PC

(57) ABSTRACT

A method includes reading operation parameters from a non-volatile memory located in a pluggable module that is coupled to a host module; processing the operational parameters with a processor located in the host module to control operation of a predistortion circuit located in the host module; adding predistortion to a signal with the predistortion circuit located in the host module and then sending the predistorted signal to the pluggable module. An apparatus includes a host module including a predistortion circuit and a processor coupled to the predistortion circuit; and a pluggable module coupled to the host module, wherein the pluggable module includes a non-volatile memory containing operational parameters for the predistortion circuit of the host module, wherein the operational parameters are processed by the processor of the host module to control the predistortion circuit of the host module.

8 Claims, 4 Drawing Sheets

Related U.S. Application Data on Nov. 9, 2011, provisional application No. 61/629,030, filed on Nov. 10, 2011, provisional application No. 61/629,029, filed on Nov. 10, 2011, provisional application No. 61/629,028, filed on Nov. 10, 2011.

(51) Int. Cl.
*H04B 10/2507* (2013.01)
*H04B 10/54* (2013.01)
*H04B 10/58* (2013.01)
*H04B 10/2575* (2013.01)
*G02B 6/42* (2006.01)
*H04B 10/50* (2013.01)

(52) U.S. Cl.
CPC ............ *H04B 10/58* (2013.01); *H04B 10/2575* (2013.01); *G02B 6/423* (2013.01); *G02B 6/4261* (2013.01); *G02B 6/4292* (2013.01); *H04B 10/50* (2013.01); *G02B 6/4284* (2013.01); *G02B 6/4279* (2013.01)
USPC ........... 375/296; 375/295; 375/297; 375/299; 375/306; 375/316

(56) References Cited

U.S. PATENT DOCUMENTS

| | | | | |
|---|---|---|---|---|
| 6,934,310 | B2 * | 8/2005 | Brophy et al. | 372/38.02 |
| 8,577,311 | B2 * | 11/2013 | Wolf et al. | 455/114.3 |
| 8,588,332 | B2 * | 11/2013 | Cai et al. | 375/296 |
| 8,812,760 | B1 * | 8/2014 | Bamford et al. | 710/110 |
| 2004/0008494 | A1 | 1/2004 | Roth | |
| 2004/0015618 | A1 * | 1/2004 | Risi et al. | 710/15 |
| 2007/0047603 | A1 | 3/2007 | Oomori | |
| 2007/0092262 | A1 * | 4/2007 | Bozarth et al. | 398/159 |
| 2007/0093107 | A1 | 4/2007 | Motohashi et al. | |
| 2007/0134006 | A1 * | 6/2007 | Krieg | 398/198 |
| 2007/0286555 | A1 | 12/2007 | Kiani et al. | |
| 2008/0101801 | A1 * | 5/2008 | Khalouf et al. | 398/193 |
| 2010/0196013 | A1 | 8/2010 | Franklin | |
| 2011/0002591 | A1 | 1/2011 | Lu et al. | |
| 2011/0053423 | A1 | 3/2011 | Song et al. | |
| 2011/0280582 | A1 * | 11/2011 | Piehler | 398/117 |
| 2013/0191877 | A1 * | 7/2013 | Rakib | 725/129 |

OTHER PUBLICATIONS

International Search Report and Written Opinion from PCT/US2012/064455, mailed Feb. 18, 2013.

International Search Report and Written Opinion from PCT/US2012/064462, mailed Mar. 4, 2013.

International Search Report and Written Opinion from PCT/US2012/064469, mailed Apr. 22, 2013.

International Search Report and Written Opinion from PCT/US2012/064472, mailed Mar. 5, 2013.

* cited by examiner

CATV TRANSMISSION SYSTEM USING ANALOG SMALL FORM FACTOR PLUGGABLE MODULES

CROSS-REFERENCES TO RELATED APPLICATION(S)

This application claims a benefit of priority under 35 U.S.C. 119(e) from provisional patent application U.S. Ser. No. 61/628,933, filed Nov. 9, 2011, U.S. Ser. No. 61/628,923, filed Nov. 9, 2011, U.S. Ser. No. 61/629,030, filed Nov. 10, 2011, U.S. Ser. No. 61/629,029, filed Nov. 10, 2011 and U.S. Ser. No. 61/629,028, filed Nov. 10, 2011, the entire contents of all of which are hereby expressly incorporated herein by reference for all purposes.

BACKGROUND

Typical transmission systems such as modern CATV (community access television) systems include a multitude of individual pieces of equipment to generate, amplify, split, combine and distribute the carrier multiplexed signal to end users. There are 2 main types of carrier multiplexed signals that are typically distributed, legacy analog and complex digitally modulated QAM (quadrature amplitude modulation) signals. These can further be divided into 2 categories, broadcast and narrowcast in which broadcast signals are sent to many end users while narrowcast signals are sent to a limited subset of end-users. Typically, legacy analog signals are broadcast while QAM modulated signals can be broadcast or narrowcast usually depending upon content type.

There are 4 main types of content that can be sent to the end user using QAM: continuous streaming video, switched digital video (SDV), video on demand (VOD) and data over cable such as internet and phone (DOCSIS {data over cable service interface specification}). Continuous streaming video is generally broadcast while SDV, VOD and DOCSIS content is generally narrowcast. Each content source generally comes from separate pieces of equipment with QAM outputs that must be combined in the RF (radio frequency) domain, with legacy analog if desired, to create the broadcast and narrowcast channel lineups that are distributed by the HFC (hybrid fiber coax) distribution equipment.

As the demand for narrowcast increases, the narrowcast service groups are generally segmented into a smaller and smaller number of end users. However, every time a service group is divided in half, the amount of equipment needed for narrowcast services effectively doubles. Because of this, space quickly becomes a limiting issue in many head-ends. In addition, channel line-up reconfiguration, power consumption and physical RF cable management are also becoming major issues.

To overcome these issues, there has been a push in the industry for higher density and convergence of the many disparate pieces of equipment needed to generate and distribute the various types of signals into a more unified system that will save space, reduce the amount of RF cabling required within the head-end, make network management and channel line-up reconfiguration easier and reduce power consumption.

To this end, a standard, interchangeable, small form factor analog pluggable optical module has been proposed. Such a module could be plugged into a high density HFC transmission system or a unified platform that generates the modulation, combines the channel line-up and drives the pluggable optical module directly. The output of such a module would connect directly into the existing fiber-optic distribution network. This would allow for increased density, more unification and modular serviceability.

However, in order to obtain similar noise and distortion performance as what is obtained in traditional HFC distribution equipment, predistortion of the signal that modulates the laser in the pluggable optical module may be required. Traditional HFC equipment often predistorts the signal that drives the laser modulation in such a manner that it compensates for the distortion produced in modulation and transmission of the signal. This helps make the received signal more linear which reduces noise and distortion.

Fitting some or all of the desired predistortion circuitry into an analog small form factor pluggable optical module may not be possible due to the limited space. It may also not be cost effective or work as effectively as desired. There may also be cost considerations that prevent inclusion of the predistortion circuitry in the small form factor pluggable optical module.

SUMMARY

There is a need for the following embodiments of the present disclosure. Of course, the present disclosure is not limited to these embodiments.

According to an embodiment of the present disclosure, a process comprises: reading operation parameters from a non-volatile memory located in a pluggable module that is coupled to a host module; processing the operational parameters with a processor located in the host module to control operation of a predistortion circuit located in the host module; adding predistortion to a signal with the predistortion circuit located in the host module and then sending the predistorted signal to the pluggable module. According to another embodiment of the present disclosure, a machine comprises: a host module including a predistortion circuit and a processor coupled to the predistortion circuit; and a pluggable module coupled to the host module, wherein the pluggable module includes a non-volatile memory containing operational parameters for the predistortion circuit of the host module, wherein the operational parameters are processed by the processor of the host module to control the predistortion circuit of the host module.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein.

It should be noted that the features illustrated in the drawings are not necessarily drawn to scale.

DETAILED DESCRIPTION

Figure 1:
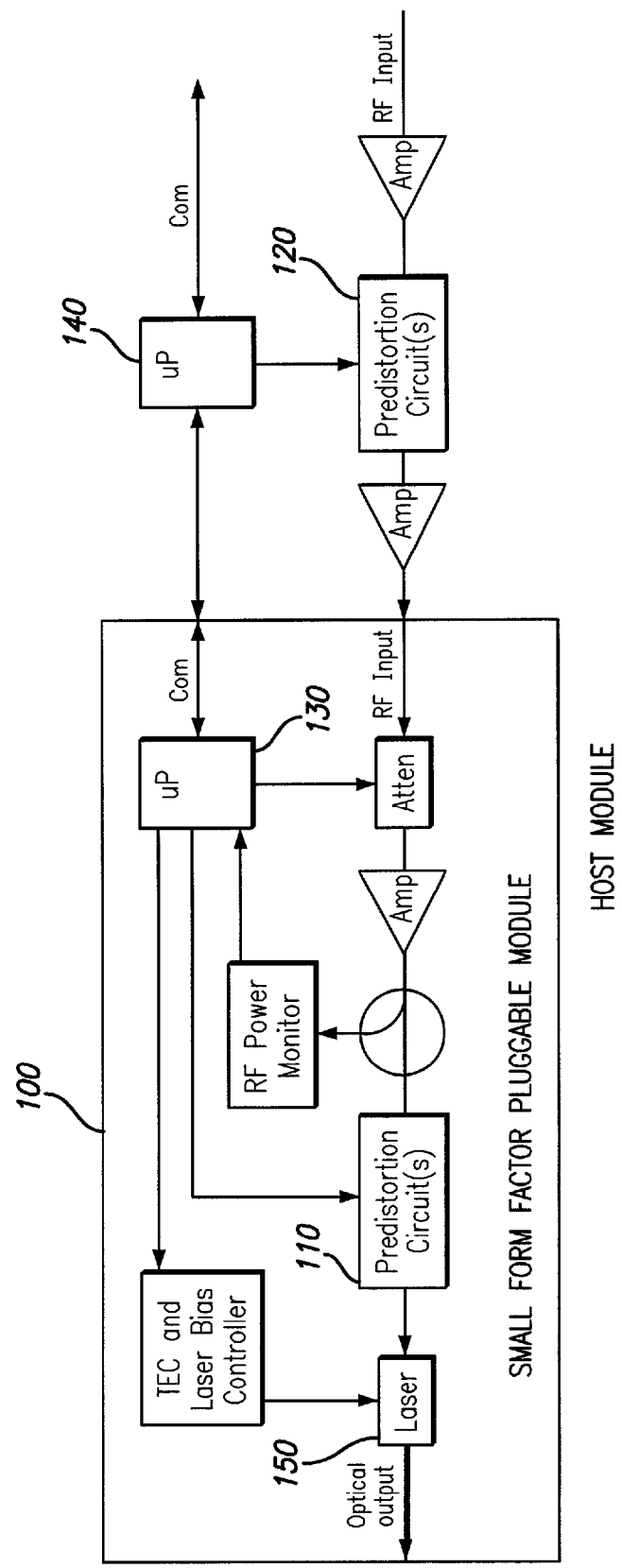
FIG. 1 is block schematic view of a basic implementation, representing an embodiment of the present disclosure.

Embodiments presented in the present disclosure and the various features and advantageous details thereof are explained more fully with reference to the nonlimiting embodiments that are illustrated in the accompanying drawings and detailed in the following description. Descriptions of well known signal processing techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

Embodiments of the invention relate to transmission of analog signals over fiber optics. More specifically, embodiments of the invention relates to small form factor pluggable modules for transmission systems such as, but not limited to, CATV systems. The disclosure of this application is marginally related to copending U.S. Ser. No. 13/672,712, filed Nov. 9, 2012, Ser. No. 13/672,714, filed Nov. 9, 2012, Ser. No. 13/672,716, filed Nov. 9, 2012, Ser. No. 13/672,718, filed Nov. 9, 2012, the entire contents of all of which are hereby expressly incorporated by reference for all purposes.

To overcome the potential limitations of putting some, all or none of the predistortion circuitry inside the analog small form factor pluggable module, the host module can contain an appropriate predistortion mechanism to predistort the signal driving the pluggable module. This predistortion mechanism can work independently or in conjunction with predistortion circuitry, that may or may not be present inside the pluggable module, to produce a substantially linear signal at the receiver. The predistortion mechanism in the host module can be realized in the analog domain using analog circuitry or in the digital domain using digital signal processing. The predistortion mechanism in the host module can be adaptive and adapt to the specific distortion produced by each pluggable module and fiber optic link or it can be fixed. Embodiments of the invention can include a communication mechanism that allows for communication between the host module and the pluggable module so the host module sets the correct predistortion settings, which are potentially different for each pluggable module, to optimally compensate for distortion produced in the link. The communication mechanism can allow the pluggable module to set the correct internal predistortion settings, when predistortion circuits exist, to achieve optimal link performance. This mechanism may be fully automatic or require a user to manually set one (1) or more parameters, such as fiber link length, to achieve the optimum performance.

Embodiments of the invention can include a system for transmitting RF signals over fiber optic cable that uses an Analog Small Form Factor Pluggable Module that plugs into a host module is described. The host module provides at least the power and the analog signals to be transmitted to the pluggable module. The pluggable module may contain some, all or no signal pre-conditioning, such as pre-distortion, to condition the signal that drives the laser modulation. The host module may also contain some, all or no signal pre-conditioning to pre-condition the signal that drives the pluggable module. The signal (pre-)conditioning may be adaptive or fixed. The end result of the signal (pre-)conditioning in the host and/or the pluggable module is substantially reduced noise and/or distortion performance at the receiver.

EXAMPLES

Specific exemplary embodiments will now be further described by the following, nonlimiting examples which will serve to illustrate in some detail various features. The following examples are included to facilitate an understanding of ways in which embodiments of the present disclosure may be practiced. However, it should be appreciated that many changes can be made in the exemplary embodiments which are disclosed while still obtaining like or similar result without departing from the scope of embodiments of the present disclosure. Accordingly, the examples should not be construed as limiting the scope of the present disclosure.

Example 1

In the most basic form, shown in FIG. 1, the host module accepts the small form factor pluggable module 100, providing power (not shown) and the RF drive signal to the pluggable module. Communication between the pluggable module and the host module is also shown but is not a required part of the present invention.

As shown in FIG. 1, both the pluggable module and the host module have predistortion circuits 110, 120. However, the pluggable module does not need to contain a predistortion circuit. The pluggable module includes a processor 130 having non-volatile memory. In addition, the host module is shown as a standalone unit including a processor 140 having non-volatile memory. However, the host may be incorporated into a larger system that provides the analog RF input. There is also gain, attenuation and RF power monitoring shown in the pluggable and host modules that are not required, but may be needed to set the drive level to the laser modulation at an appropriate level. Finally, the optical transmitter is shown as a laser 150. The laser may be a directly modulated laser or an externally modulated laser in which the output is modulated using techniques such as electro-absorption modulation, Mach-Zender modulation or any appropriate technique for producing analog modulated optical signal.

In a preferred embodiment, there is no predistortion circuitry in the pluggable module and the host module predistortion settings required for optimum performance are stored in the non-volatile memory of the pluggable optical module. These predistortion setting may be unique for each individual module or for each type of module and may be set by the pluggable module manufacturer using appropriate techniques to determine the optimum predistortion settings. At power up, the host module predistortion settings stored in the pluggable optical module are read by the host module and implemented by the predistortion circuit in the host module, typically by providing appropriate bias voltages or currents to the predistortion circuit. The host module may also use input from a user interface and/or other "smart" equipment to determine, in conjunction with the parameters stored in the pluggable module or elsewhere, the optimum predistortion settings to achieve lowest noise and distortion at the receiver.

Some examples of additional user input or parameters that may come from other "smart" equipment include, but are not limited to, fiber link length, transmitter optical mux dispersion and receiver optical mux dispersion.

Example 2

Figure 2:
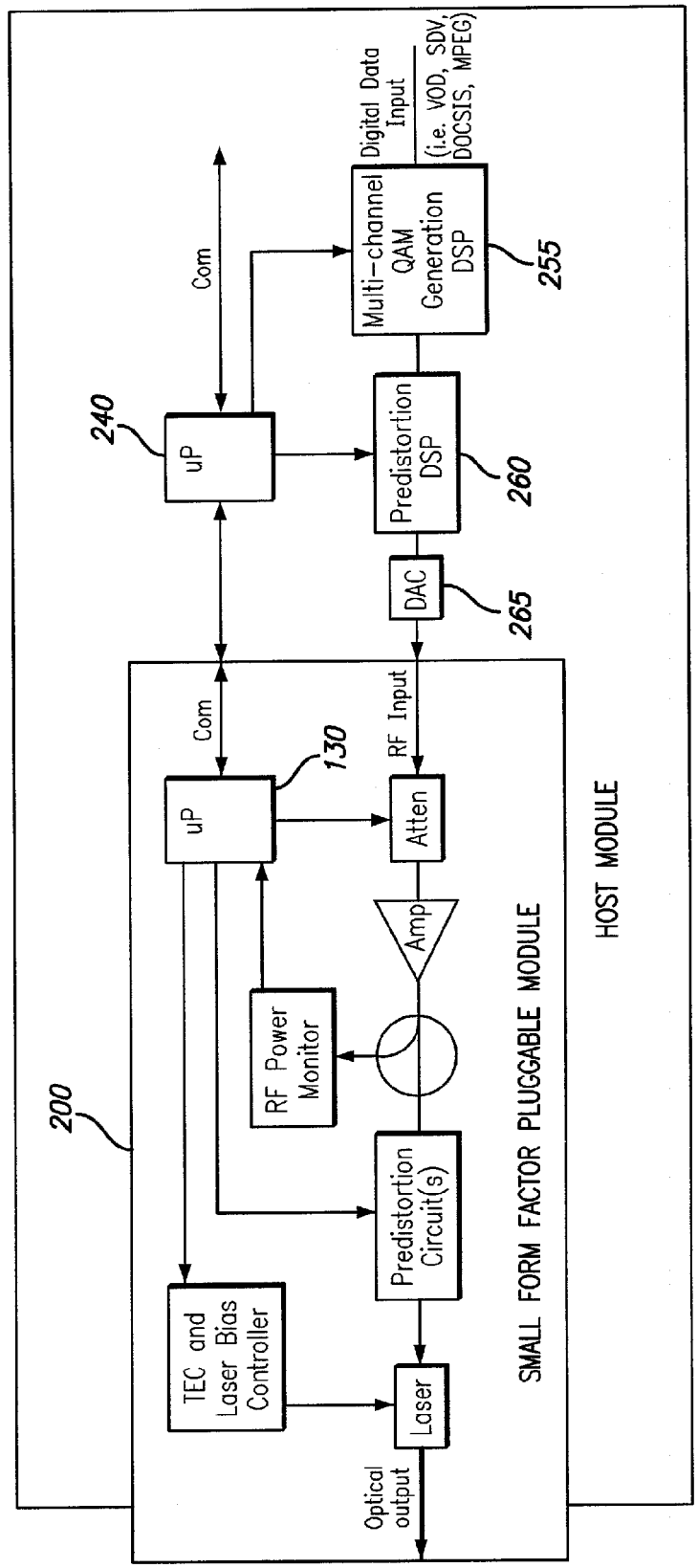
FIG. 2 is block schematic view of another implementation, representing an embodiment of the present disclosure.

FIG. 2 shows a simplified embodiment of host module predistortion implemented in the digital domain using a DSP (digital signal processor). In this embodiment, digital data is fed into a DSP 255 that generates a multi-channel QAM signal. The data output from this DSP is fed into the predistortion DSP 260 which, in conjunction with parameters set by the microprocessor 240, generates the distorted digital signal that drives the (digital to analog convertor) DAC 265. The DAC converts the signal from the digital domain to the analog domain, the output of which will be a distorted version of multi-channel QAM signal that is to be transmitted. This signal is input into the pluggable module 200 and transmitted to the receiver. The digital DSP based predistortion has substantially the same effect as the analog based predistortion circuit in that it compensates for distortion from transmission, substantially improving noise and distortion performance at the receiver. In the case of QAM transmission, this results in higher MER (modulation error ratio) and lower BER (bit error ratio).

In a preferred embodiment, there is no analog predistortion in the pluggable module and the parameters given to the predistortion DSP by the host module microprocessor are determined from parameters stored in the pluggable module and/or parameters input by the user, such as fiber link length, and/or parameters provided by other "smart" equipment in the link. The method of determining and setting the optimum predistortion parameters may be substantially the same as for the analog predistortion circuit.

Implementation of predistortion in the digital domain may have advantages over implementation in the analog domain, such as the ability to more accurately compensate for various types of distortion including, but not limited to, $2^{nd}$ order and $3^{rd}$ order distortion, both time and non-time dependent. It may also allow for independent compensation of higher order distortion, such as $4^{th}$ and $5^{th}$ order distortion, which is difficult to do in the analog domain. Also, a DSP based predistortion may have greater flexibility to predistort to compensate for distortion produced from a wider variety of pluggable modules with different optical modulation mechanisms. Finally, there may be cost and space advantages over the analog predistortion circuit. However, a DSP predistortion has the disadvantage that any analog RF signal combined with the output from the DAC will not be compensated for. A solution to this potential disadvantage (problem) is shown in FIG. 3.

Example 3

Figure 3:
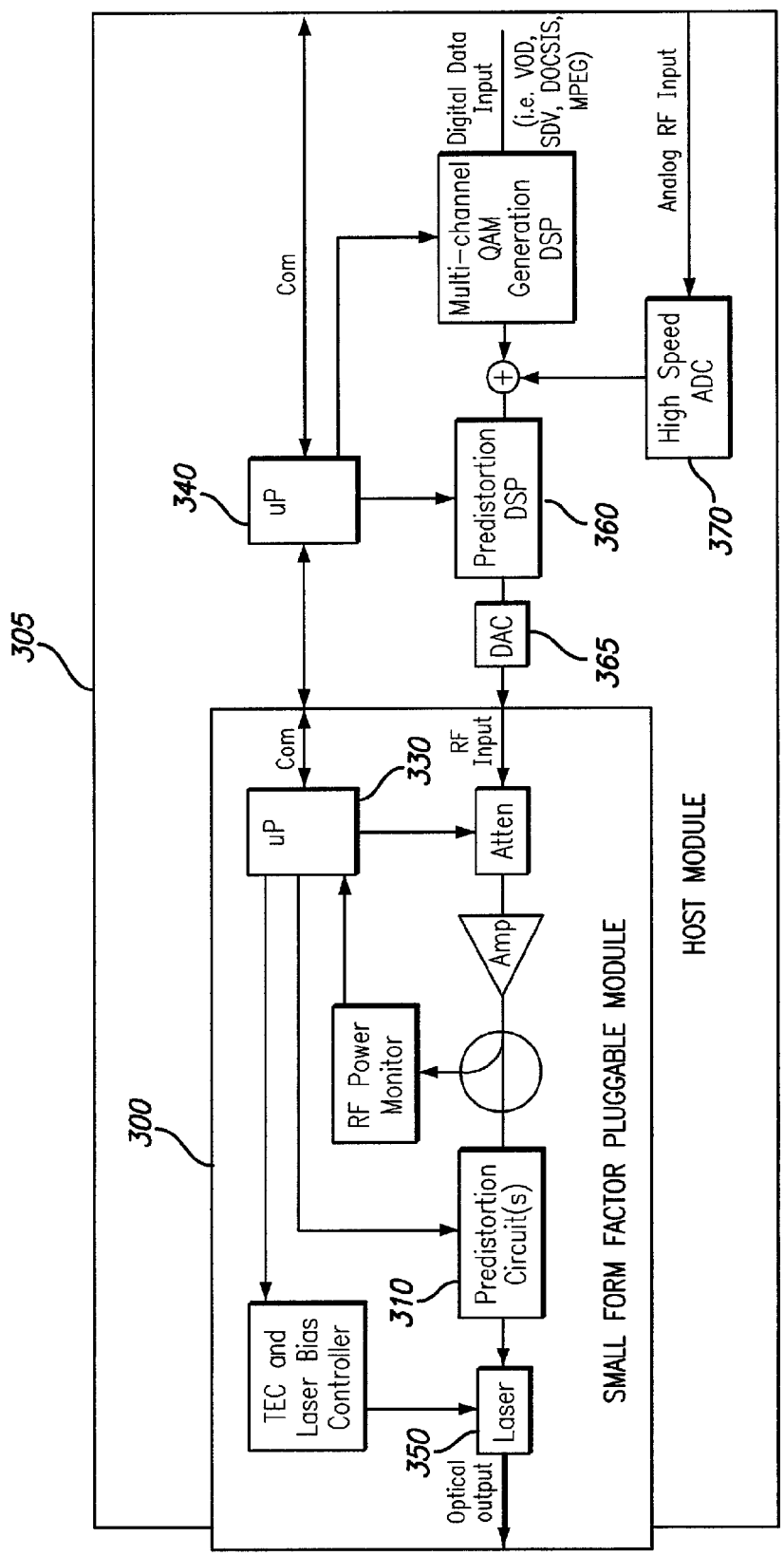
FIG. 3 is block schematic view of another implementation, representing an embodiment of the present disclosure.

Referring to FIG. 3, both the pluggable module 300 and the host module 305 have predistortion circuits 310, 360. However, the pluggable module does not need to contain a predistortion circuit. The pluggable module includes a processor 330 having non-volatile memory. In addition, the host module is shown as a standalone unit including a processor 340 having non-volatile memory. Again, the host may be incorporated into a larger system that provides the analog RF input. Again, there is also gain, attenuation and RF power monitoring shown in the pluggable and host modules that are not required, but may be needed to set the drive level to the laser modulation at an appropriate level. Within the pluggable module, the optical transmitter is shown as a laser 350.

FIG. 3 shows the analog signals converted into digital by a high speed (analog to digital convertor) ADC 370, fed into the predistortion DSP and converted back to analog by the DAC 365. This would provide for the predistortion DSP to compensate for both the analog and digital QAM modulation, but may result in unacceptable digitization noise on the analog input.

Example 4

Figure 4:
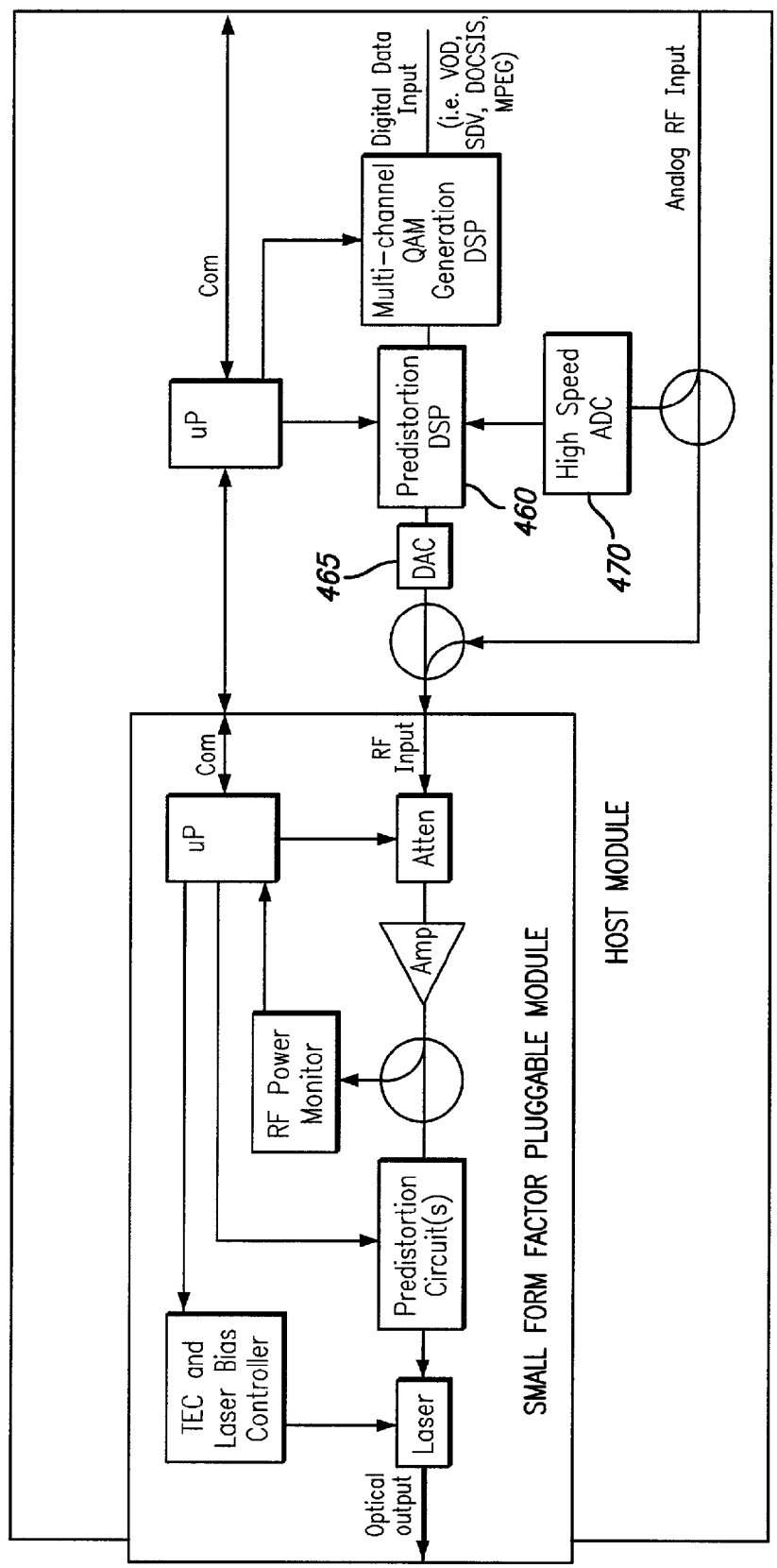
FIG. 4 is block schematic view of another implementation, representing an embodiment of the present disclosure.

Referring to FIG. 4, to overcome the issue mentioned in the foregoing example, a portion of the analog signal can be tapped off from the analog input and digitized by a high speed ADC 470 for use by the predistortion DSP 460 to compensate for the analog drive which is combined with the output from the DAC 465 in the analog domain.

It should be noted that it is also possible to have a host module with a combination of digital and analog predistortion whereby the combination of predistortion from the digital and analog portions cancel out the distortion produced in transmission of the signal(s). Similarly, this can be used with a pluggable module that has on-board predistortion capability or does not have on-board predistortion capability. Also, it may be possible for a pluggable module to be used with multiple types of host modules whereby the predistortion in the pluggable module is adapted to the capability of the host module.

Direct digital conversion of the entire multi-channel signal with a single high speed DAC is shown for simplicity. Alternatively, multiple DACs can be used, the outputs of which can be frequency shifted and combined in the analog domain. This alternative embodiment does not preclude the general idea of digital predistortion. However, it may make the implementation somewhat more complicated than what is shown in the illustrated simplified implementations and described above due to the need to incorporate multiple data streams, account for any frequency shifting and potentially split the predistorted signal between multiple DACs.

DEFINITIONS

The terms program and/or software and/or the phrases computer program and/or computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency (RF) is intended to mean frequencies less than or equal to approximately 300 GHz as well as the infrared spectrum.

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be combined in the disclosed configurations, but could be combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   reading operation parameters from a non-volatile memory located in a pluggable module that is coupled to a host module;
   processing the operational parameters with a processor located in the host module to control operation of a predistortion circuit located in the host module;
   converting an analog radio frequency input to a digital signal with an analog to digital convertor located within the host module;
   adding the digital signal to a generated digital signal for processing by a digital signal processor of the predistortion circuit located in the host module;
   adding a digital predistortion signal to the generated digital signal with the predistortion circuit located in the host module;
   sending the digital predistortion signal and the generated digital signal to the pluggable module; and
   processing the digital predistortion signal and the generated digital signal that was sent to the pluggable module with another predistortion circuit located within the pluggable module.

2. The method of claim 1, further comprising
   splitting the analog radio frequency input before the analog to digital convertor,
   bypassing the analog to digital convertor, the predistortion circuit located in the host module and a digital to analog convertor located in the host module with a split portion of the analog radio frequency input and
   sending the split portion of the analog radio frequency input to the pluggable module as an analog drive.

3. The method of claim 1, wherein a digital to analog convertor is coupled between the digital signal processor of the predistortion circuit and the pluggable module and conveys the digital predistortion signal, the generated digital signal and a sampled analog signal to the pluggable module after conversion to analog by the digital to analog convertor.

4. The method of claim 2, wherein the digital to analog convertor is coupled between the digital signal processor of the predistortion circuit and the pluggable module and conveys the digital predistortion signal and the generated digital signal to the pluggable module after conversion to analog by the digital to analog convertor.

5. An apparatus, comprising:
   a host module including a predistortion circuit and a processor coupled to the predistortion circuit; and
   a pluggable module coupled to the host module, wherein the pluggable module includes a non-volatile memory containing operational parameters for the predistortion circuit of the host module, wherein the operational parameters are processed by the processor of the host module to control the predistortion circuit of the host module,
   wherein the predistortion circuit includes a predistortion digital signal processor to provide a digital predistortion signal,
   wherein the host module includes a digital signal generation digital signal processor coupled to the predistortion circuit,
   wherein the host module includes an analog to digital convertor coupled to the predistortion circuit that converts an analog radio frequency input for addition to an output of the digital signal generation digital signal processor before processing by the predistortion digital signal processor of the predistortion circuit.

6. The apparatus of claim 5, wherein the analog radio frequency input is split before the analog to digital convertor and a portion of the analog radio frequency input is conveyed to the pluggable module as an analog drive while bypassing the digital signal processor of the predistortion circuit and a digital to analog convertor.

7. The apparatus of claim 5, wherein a digital to analog convertor is coupled between the digital signal processor of the predistortion circuit and the pluggable module and conveys the digital predistortion signal a generated digital signal and a sampled analog signal to the pluggable module after conversion to analog by the digital to analog convertor.

8. The apparatus of claim 6, wherein the digital to analog convertor is coupled between the digital signal processor of the predistortion circuit and the pluggable module and conveys the digital predistortion signal and a generated digital signal to the pluggable module after conversion to analog by the digital to analog convertor.

* * * * *